US008215652B2

(12) United States Patent
Dashew et al.

(10) Patent No.: US 8,215,652 B2
(45) Date of Patent: Jul. 10, 2012

(54) MOBILIZER FOR EXERCISE, REHABILITATION AND WELLNESS

(75) Inventors: Stanley Dashew, Los Angeles, CA (US); Charles Blount, West Hollywood, CA (US)

(73) Assignee: Dashaway Company, Canoga Park, CA (US)

( * ) Notice: Subject to any disclaimer, the term of this patent is extended or adjusted under 35 U.S.C. 154(b) by 397 days.

(21) Appl. No.: 12/404,231

(22) Filed: Mar. 13, 2009

(65) Prior Publication Data

US 2009/0224499 A1 Sep. 10, 2009

Related U.S. Application Data

(63) Continuation-in-part of application No. PCT/US2007/078680, filed on Sep. 17, 2007.

(60) Provisional application No. 60/825,895, filed on Sep. 15, 2006.

(51) Int. Cl.
*B62M 1/00* (2010.01)

(52) U.S. Cl. ......... 280/87.05; 5/81.1 R; 135/67; 135/74; 135/75; 135/85; 280/87.021; 280/87.041

(58) Field of Classification Search ............... 280/87.05, 280/87.021, 87.041; 468/66, 67, 68; 5/81.1 R; 135/67, 74, 75, 85; 296/5, 6
See application file for complete search history.

(56) References Cited

U.S. PATENT DOCUMENTS

| | | | | |
|---|---|---|---|---|
| 5,329,954 | A | 7/1994 | Miyoshi | |
| 5,356,237 | A | 10/1994 | Sung | |
| 5,364,120 | A * | 11/1994 | Shimansky | 280/650 |
| 5,538,268 | A * | 7/1996 | Miller | 280/87.05 |
| 5,702,326 | A * | 12/1997 | Renteria | 482/68 |
| 7,111,856 | B1 | 9/2006 | Graham | |
| 7,179,200 | B1 * | 2/2007 | Wu | 482/51 |
| 7,484,740 | B2 * | 2/2009 | Miller | 280/87.021 |
| 2003/0137119 | A1 * | 7/2003 | Razon | 280/87.021 |

FOREIGN PATENT DOCUMENTS

| | | | |
|---|---|---|---|
| CH | 321317 | A | 4/1957 |
| CN | 2294723 | Y | 10/1998 |
| CN | 2391599 | Y | 8/2000 |
| DE | 9315573 | U1 | 2/1994 |
| DE | 20213796 | U1 | 10/2003 |
| EP | 0873741 | A | 10/1998 |
| JP | 2002065774 | A | 3/2002 |
| JP | 2002-65774 | * | 5/2002 |

* cited by examiner

*Primary Examiner* — Eric Culbreth
(74) *Attorney, Agent, or Firm* — Venable LLP; Stefan J. Kirchanski

(57) ABSTRACT

The mobilizer consists of an open, inverted "U" shaped frame when view from above with the legs or the "U" pointed towards the rear. Pivoting caster wheels are attached to the front lower corners and rear wheel support arms extend rearward and curve downward each bearing a smaller non-pivoting wheel. Two vertical upright support members rise from the frame and are equipped with height adjustment mechanisms. Horizontal arm support assemblies, each with a hand grip and brake handle are attached to the upper ends of the support members. The user is supported by his elbows and shoulder girdle resulting in decompression of his spine. The arm support assemblies can be pivoted 180 degrees so that the grip portions and the hand brake levers face the rear of the mobilizer at about waist height. This allows the user to stand and grasp the handles as he walks forward.

19 Claims, 20 Drawing Sheets

MOBILIZER FOR EXERCISE, REHABILITATION AND WELLNESS

CROSS-REFERENCE TO PRIOR APPLICATIONS

The present application is a continuation-in-part application of and claims the priority and benefit of PCT/US2007/078680 filed on 17 Sep. 2007 and designating the United States, which application was in turn based on, and claimed the priority and benefit, U.S. Provisional Patent Application No. 60/825,895 filed 15 Sep. 2006, all of which applications are incorporated herein by reference.

U.S. GOVERNMENT SUPPORT

Not Applicable

BACKGROUND OF THE INVENTION

1. Area of the Art

The present invention is directed towards a device for improving the mobility of disabled persons.

2. Description of the Background Art

Disabled, injured or elderly persons often have limited mobility on their own, and need some form of support when walking or moving about. Mobility support devices are well known in the art, and provide varying degrees of support depending on the needs of a user. For instance, a cane or walker may provide minimal support to a user, whereas crutches support most of a user's weight. As might be imagined a large number of more or less complicated mobility support devices are known in the art. There is a large variety of wheelchairs and walkers (also know as "rollators"). A typical example of these devices is disclosed in U.S. Pat. No. 5,538,268 to Miller.

While these prior art devices can provide adequate mobility support for many a disabled, injured, or elderly user, they fail to adapt to the nature or severity of a user's disability, condition, or injury. Specifically, the support provided by prior art walkers, canes or crutches cannot readily be increased or decreased depending on the needs of a user. Further, the area of the user's body supported by these devices cannot be changed. For example, if a user needing minimal walking support injures his wrist, he would not be able to use a device providing support by way of the hands. The individual may, therefore, be required to use a device that provides support by way of the armpits, or even a wheelchair for total body support. However, such devices may provide more support than the user requires. After the user's wrist has healed, he might again need to use a different device, such as a cane or walker that operates by means of a user's hands, to provide the correct level of support. Consequently, it is an object of the current invention to provide a reconfigurable mobilizer which can allow the level and location of support to be adjusted based on the needs of the user.

SUMMARY OF THE INVENTION

The present invention is a significantly improved mobility device for allowed injured, handicapped and elderly persons to move about more readily while actually aiding in rehabilitation and amelioration of various mobility impairing conditions. The inventors have coined the term "mobilizer" to distinguish their invention from previous devices.

The mobilizer consists of an open frame constructed from metallic tubes for lightness and strength. The frame is formed from two side assemblies or side frame components that are each conceptually squares (roughly 11" or 28 cm on each side) formed from the tubing. The tubing forming the rear vertical side of the square is open top and bottom. These side assemblies are joined across the front by two elongate members. An upper elongated member connects the upper front corners of the square assemblies while a lower elongated member connects the lower front corners of the square assemblies to create a frame that resembles an inverted "U" when view from above with the legs or the "U" pointed towards the rear. The entire frame is about 22" (56 cm) wide. Pivoting caster wheels are attached to the front lower corners of the frame lifting the bottom edge of the frame several inches above the ground. Rear wheel support arms extend rearward from the rear vertical sides of the square assemblies. These extending arms curve downward so that their distal ends can each bear a wheel that is fixedly aligned with the long axis of the support arms. These rear wheels are preferably only 60% or so the diameter of the front caster wheels. The rear wheel support arms significantly extend the rearward legs of the inverted "U" shaped frame.

Thus the mobilizer has caster wheels at the front two corners and smaller fixed wheels at the rear corners. This allows the device to be extremely maneuverable so that it can readily navigate sharp turns. The entire frame is relatively low to the ground (less than about 24" (61 cm) high) so that the center of gravity is also very low. The distance from the axle of a front wheel to the axle of the corresponding (that is, on the same side) wheel is about 22" (56 cm) so that the "U" formed by the frame and rear wheel support arms is essentially a square open in the rear. It will be appreciated that such a configuration is extremely stable and very resistant to tipping. For storage purposes a mechanism is provided so that the rear wheel support arms can be folded laterally to lie within the square portion of the frame.

A user interacts with the mobilizer primarily by entering it through the open rear side of the frame. This way the user is essentially surrounded by and protected by the frame. Two vertical upright support members rise from the frame, one from each rear upper corner. A height adjustment mechanism allows the height of each support member to be adjusted in small increments to match the physical size and status of the user. A horizontally oriented arm support assembly is attached to the upper end of the support arms. The arm support assembly consists of a horizontal component with a vertically oriented grip portion and hand brake lever towards the front of the mobilizer and an arm rest for cupping a user's elbow towards the rear end of the horizontal component. In a preferred embodiment the brakes are "default" or "dead man's" brakes applied to the rear wheels by means of cables. With a default brake the mobilizer will not move until the user releases the brakes by pulling the brake handles. Should a user stumble or otherwise lose his hold on the brake handles, the mobilizer automatically comes to a halt thereby avoiding the danger of a runaway. The system includes a mechanical brake equalizer so that operating either brake handle simultaneously operates both of the brakes equivalently.

Because the upright support members include a height adjustment mechanism, the horizontal support component can be located from about 37" (94 cm) to about 47" (119 cm) above the ground. This configuration is intended particularly for elderly or disabled individual with spinal compression or other spinal problems. The user places his arms along the horizontal arm support assembly so he is partially supported by his elbows and shoulder girdle. This causes decompression or traction to the spine which can significantly decrease pain due to pressure on nerves and other problems. In addition, this removes a significant amount of weight from the user's legs.

This allows a user with spinal disabilities to actually propel himself about and obtain exercise and pain relief not available with a wheelchair. For users recovering from fractures or leg surgery, this allows the user to start exercise and rehabilitation much more quickly. The mobilizer is much smoother and easier to use than crutches. Stroke and other neurologically impaired users who would not be able to even handle crutches or maintain their balance are able to relearn how to walk. The mobilizer can be advantageously used by Parkinson's disease patients because the arm support assemblies provide balance and stability especially during a "freeze" where the patient is temporarily unable to control certain muscles. Furthermore, the mobilizer can readily be equipped with visual or audible prompts to help a supported user overcome Parkinsonian "freezes."

Because the mobilizer provides support through the user's arms, it is also ideal for the training of amputees. The support can be adjusted to limit the weight applied a prosthetic leg until the stump has completely healed and tenderness decreases. Traditionally, amputees learn to walk by being supported by parallel bars which are often of limited availability at hospitals and rehabilitation facilities. The mobilizer in the decompression configuration can substitute for the parallel bars. It will also be appreciated that specialized support structures can be attached to the mobilizer to make it even more suitable for amputees.

Not only can the mobilizer be used in a decompression mode where the user's weight is partially supported through his arms, the unit can also be used in a more traditional "walking" mode. This is possible because there is a pivot at the juncture between the upright support members and the arm support assemblies. This allows the arm support assemblies to be pivoted 180 degrees so that the grip portions and the hand brake levers face the rear of the mobilizer at about waist height. This allows the user to stand in a more or less natural pose and grasp the handles as he walks forward. In this configuration the user is slightly supported (as with a walker) by the mobilizer and protected from falling. If the user becomes at all unsteady, he can release the brakes and lean on the mobilizer to regain balance. It will be appreciated that the walking mode of the mobilizer is more appropriate for a less disabled user or for use after the exercises in the decompression mode has led to rehabilitation. There are also a number of situations where a user may place one of the upright support members in the decompression mode and the other in the walking mode. This can be helpful when walking laterally across a slope to keep the users spine upright. Rotating the arm support members from one mode to the other can also be a safe but effective upper body exercise. It will also be appreciated that the great stability of the mobilizer frame combined with its ready height adjustability makes the mobilizer an ideal exercise stand for a variety of exercise intended to rehabilitate and increase the strength and wellness of the user. Instead of having to obtain or go to an exercise device, the mobilizer user finds that the mobilizer itself serves as such a device.

The mobilizer is provided with a flat seat hingedly supported by the frame side assemblies and the upper elongate joining member. This seat can be moved out of the way if the user needs to stand in the front most portion of the frame or if a basket or other attachment is to be located in the same area. The seat is to accommodate the user who needs rest. The user can sit on the seat facing the normal rear of the mobilizer and move himself forward by means of his feet. Alternately, the mobilizer can be used like a wheelchair with the user sitting on the seat facing forward with an attendant grasping the arm support assemblies (in the walking mode) to push the mobilizer (and the user) forward. A reconfigurable back support can be provided to support the user sitting either in a forward or a backward direction on the seat.

DETAILED DESCRIPTION OF THE INVENTION

The following description is provided to enable any person skilled in the art to make and use the invention and sets forth the best modes contemplated by the inventor of carrying out this invention. Various modifications, however, will remain readily apparent to those skilled in the art, since the general principles of the present invention have been defined herein specifically to provide a mobilizer to aid in walking, rehabilitation and support of disabled persons.

Figure 1:
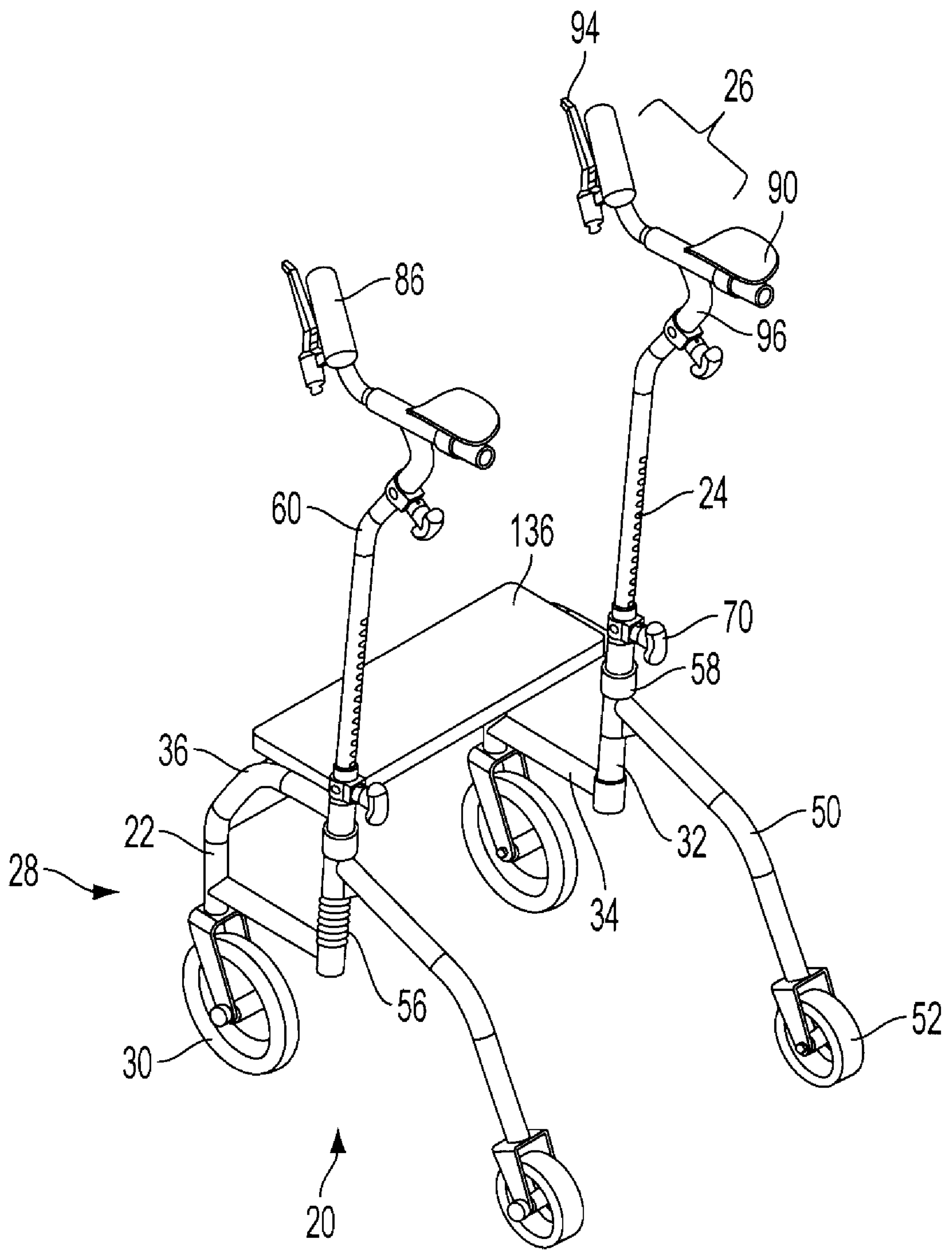
FIG. 1 shows a perspective view of the device from the rear.
Figure 2:
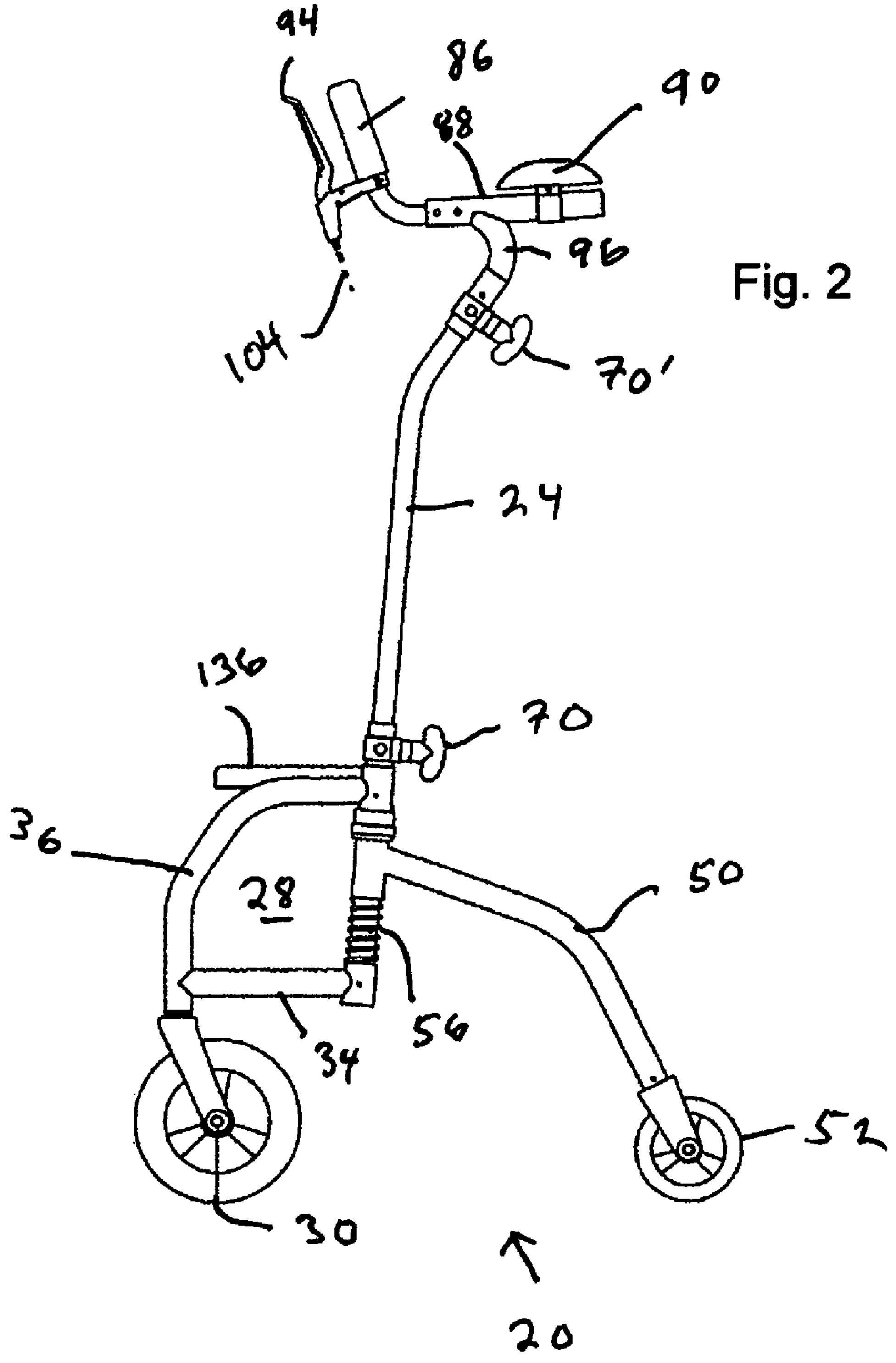
FIG. 2 shows a side view of the device.

FIG. 1 shows a preferred embodiment of the mobilizer in perspective view from the rear. FIG. 2 shows a side view of the device. The device 20 is constructed as a base frame 22 and substantially upright support members 24 which bear arm support assemblies 26 for supporting the user's weight through the user's arms. Although round tubular aluminum is the presently preferred structural material, the structural members/elements of the mobilizer can be constructed from other appropriate metals such as steel, titanium or chromemoly, plastics, composite materials, such as carbon fiber, or combinations thereof. The material from which the mobilizer device is constructed should be strong, lightweight, and stiff enough to maintain its shape in spite of the weight exerted by the user. As viewed from above, the base frame has substantially the shape of an inverted "U." In side view the lower portion of the base frame consists of two more or less "square" side assemblies 28 which form the right hand and left hand front portions of the base frame. Large caster wheels 30 (8" or 20.3 cm in the preferred embodiment) are pivotingly attached to the forward lower corners of the frame, and the upright support members are inserted into the rear vertical portions of the base frame.

Figure 3:
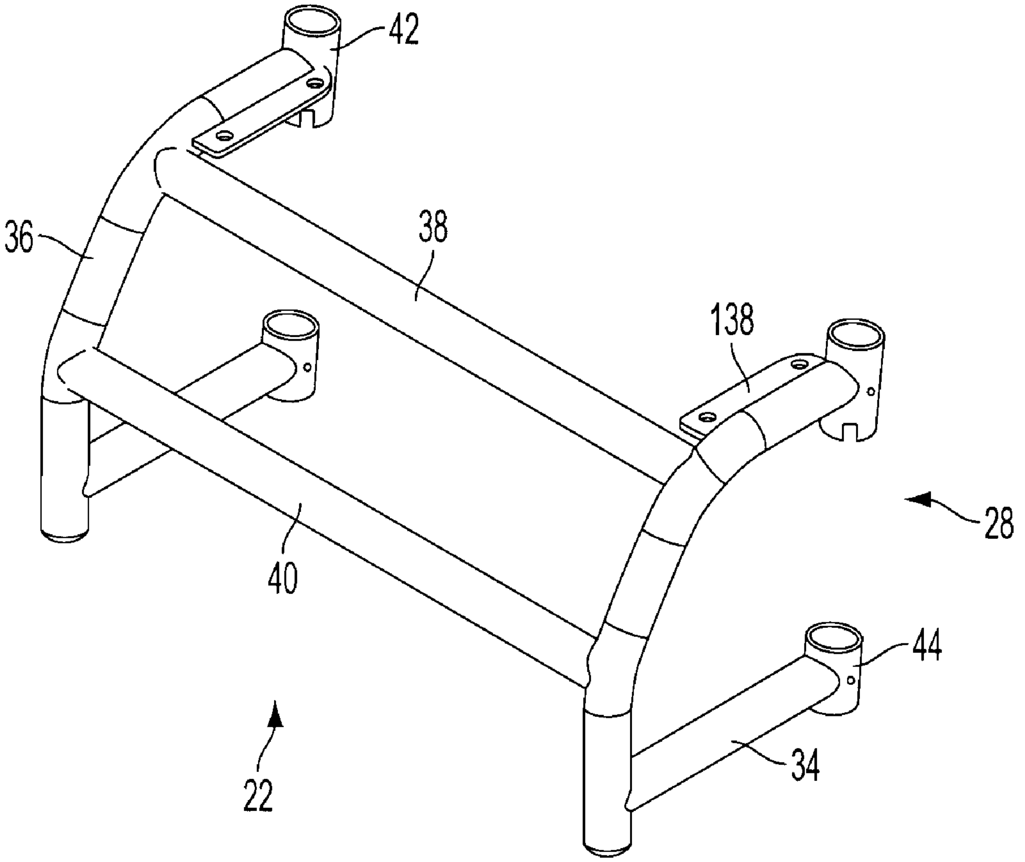
FIG. 3 shows a perspective view of the lower part of the frame.
Figure 4:
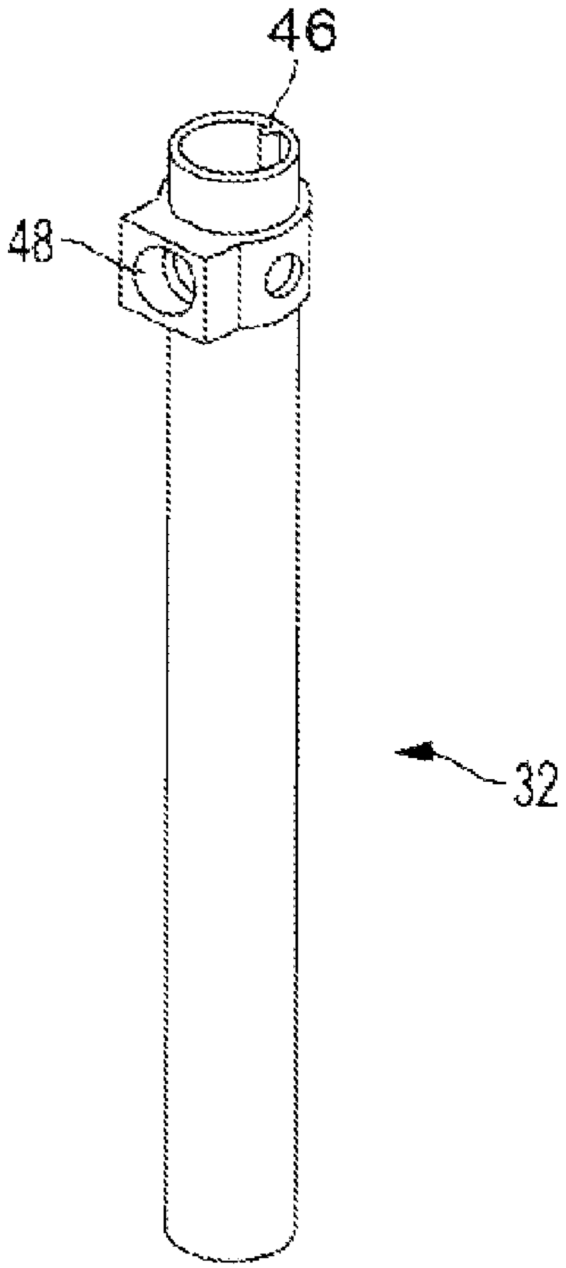
FIG. 4 shows the vertical end pieces of the frame.

In the preferred embodiment each of the "square" side assemblies 28 is conceptually formed from three components: two rearward pieces (vertical end piece 32 and horizontal end piece 34) meeting at essentially a right angle at the lower rear corner of the frame and a single curved member 36 connecting the horizontal end piece and vertical end piece and forming the front "corner" of the "square." It will be apparent that the "square" actually has somewhat the shape of a capital "D" as viewed from the right side of the device although true square or other shapes are possible so long as sufficient structural rigidity is maintained. FIG. 3 shows a perspective view of the lower frame assembly. The front of the base frame is formed by an upper joining member 38 and a lower joining member 40 which connect the two "square" side assemblies. Each curved member 36 bears an upper tubular sleeve 42 at its upper end, and each horizontal end piece bears a lower tubular sleeve 44 at its rearmost end. From this view it is apparent while the horizontal end pieces 34 are rigidly attached to the curved members 36 at the lower front corners of the base frame 22, the vertical end pieces 32 are connected to the frame by being inserted through the tubular sleeves 42, 44. FIG. 4 shows one of the vertical end pieces 32. The end piece is a hollow tube with an essential triangular (in cross section) internal ridge 46 or projection running the length of the piece and a welded collar 48 at its upper end. Each vertical end piece passes through one of the upper tubular sleeves 42 with its lower end captured (e.g. by a set screw) in the corresponding lower tubular sleeve 44. The vertical end pieces 32 are fixed rigidly in place by set screws that capture the upper tubular sleeves 42 and the lower tubular sleeves 44. Other methods of affixing the end pieces to the sleeves such as welds or adhesives can also be used. In this manner the vertical end pieces close the "square" side assemblies 28 of the base frame 22.

Figure 5:
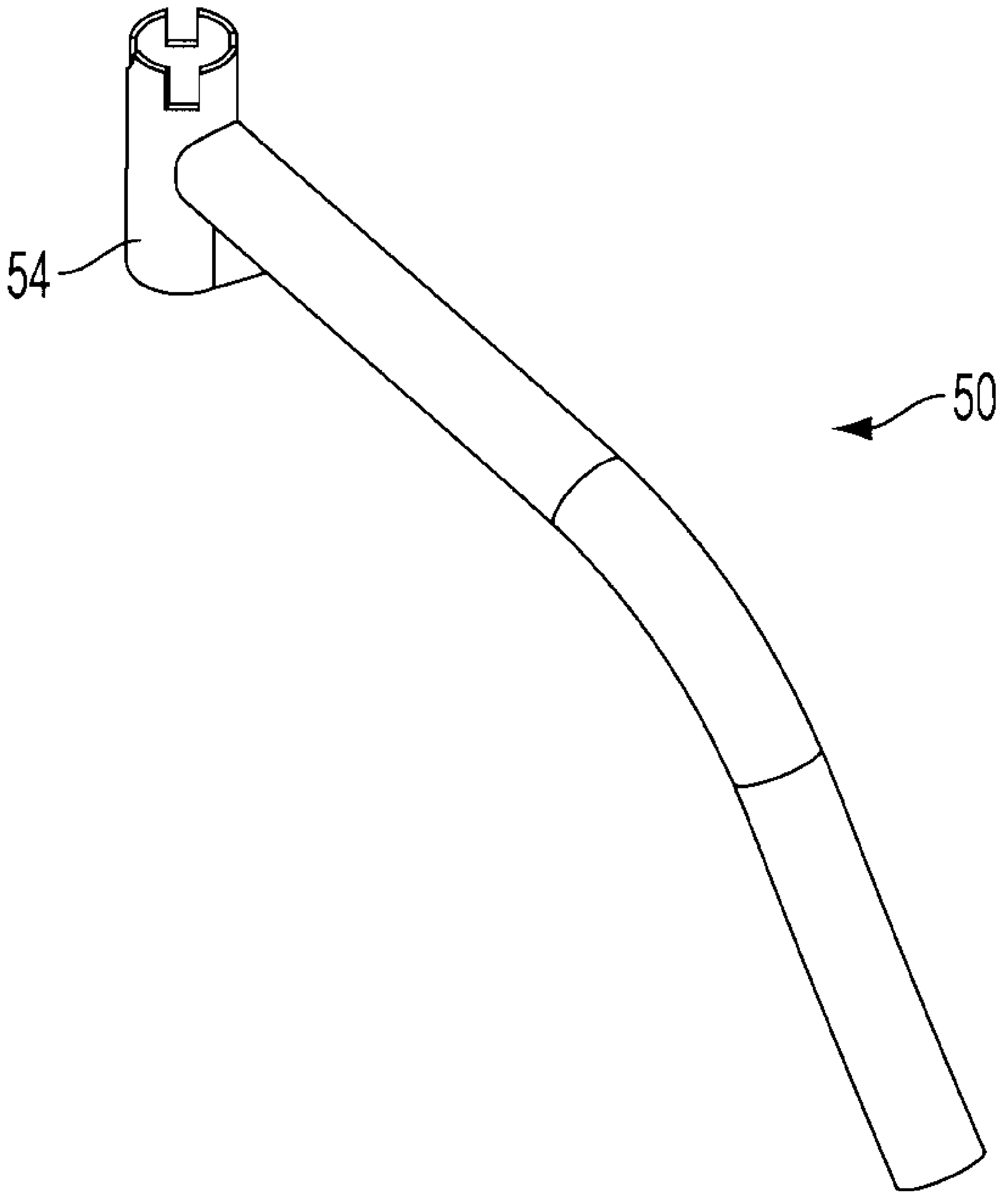
FIG. 5 shows a perspective view of the rear wheel support arm.

A rear wheel support arm 50 is connected to each of the rear vertical members 32 of the side assemblies with a smaller (5" or 12.7 cm in a preferred embodiment) non-pivoting wheel 52 attached at the distal end of each support arm. As shown in FIG. 5, each rear wheel support arm 50 bears a toothed tubular sleeve 54 at its proximal end. The vertical end piece 32 is inserted through this tubular sleeve 54 to capture the support arm sleeve 54 between the upper and lower corners of the side assemblies 28. The toothed tubular sleeves 54 are sized so that the vertical end pieces 32 act as axles with the toothed tubular sleeves 54 (and the attached support arms) free to pivot about them. This allows the left hand rear wheel support arm to be pivoted to the right and the right hand rear wheel support arm to be pivoted to the left so that the support arms lie within the base frame thereby folding or collapsing the device for storage or transport. In actual operation a spring 56 is coaxial with and surrounds the vertical end piece 32 so as to bias the rear wheel support arm 50 in an upward direction so that the teeth on the toothed tubular sleeve interact 54 with corresponding teeth on the tubular sleeves 52 attached to the upper end of each of the curved members 36. A plastic collar 58 covers the intermeshing teeth to avoid the accidental pinching of fingers or capturing of clothing parts by the intermeshing teeth. In a preferred embodiment, the teeth are cut into rings of reinforced nylon or delrin plastic which rings are then glued to the end of each of the tubular sleeves. The plastic provides lubricity not found with a metal-metal interaction where binding or galling may occur. The interaction between the teeth locks the wheel support arms in the extended position. The force of the springs 56 as well as the weight of the entire device (and a supported user) reinforce this interaction and ensure that the wheel support arms do not become unlocked. However, when the device is not in use, it is a simple matter to press down on one of the wheel support arms 50 thereby causing the corresponding spring 56 to compress and the teeth to disengage so that the wheel support arm 50 can be easily swung into the folded or storage position.

Figure 6:
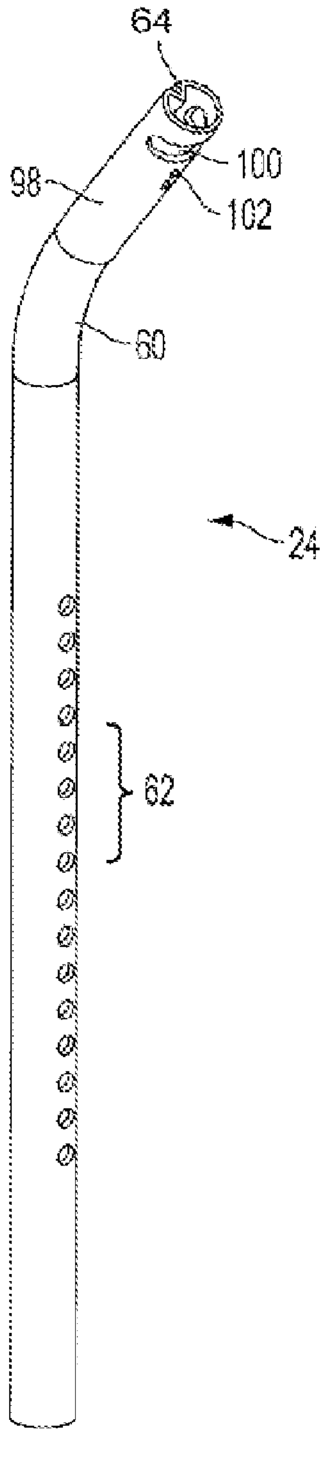
FIG. 6 shows one of the upright support members.

As shown in FIG. 6, each of the upright support members 24 is a substantially straight tubular member with a rounded bend of about 150 degrees near its upper end. A series of spaced apart holes 62 (¾" or 1.91 cm) penetrate the lower portion of the member and a "V" shaped groove 64 runs down the forward facing side of the member. In use the lower end of each upright support member is inserted into the upper open end of one of the vertical end pieces 32 in the base frame 22. The triangular internal ridge 46 of the vertical end piece is captured by the "V" shaped groove 64 to prevent the upper support member 24 from pivoting within the vertical end piece 32. The spaced apart holes 62 are used as height adjustments for the upright support members 24. A cotter 66 (shown in FIG. 7) attached to an adjustment handle 68 is inserted through a hole 62 to select a desired height for the upright support member 24. Each of the upright support members 24 can have a different height to accommodate physical variations in users.

Figure 7:
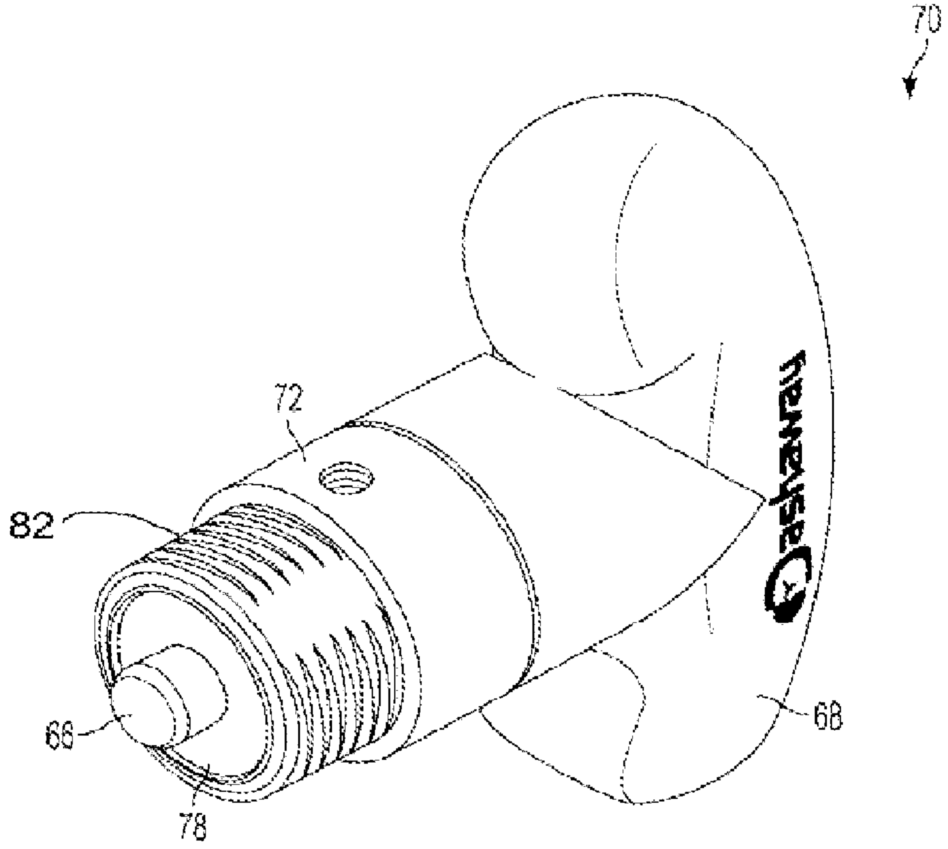
FIG. 7 is a perspective view of the adjustment handle-cotter assembly.
Figure 8:
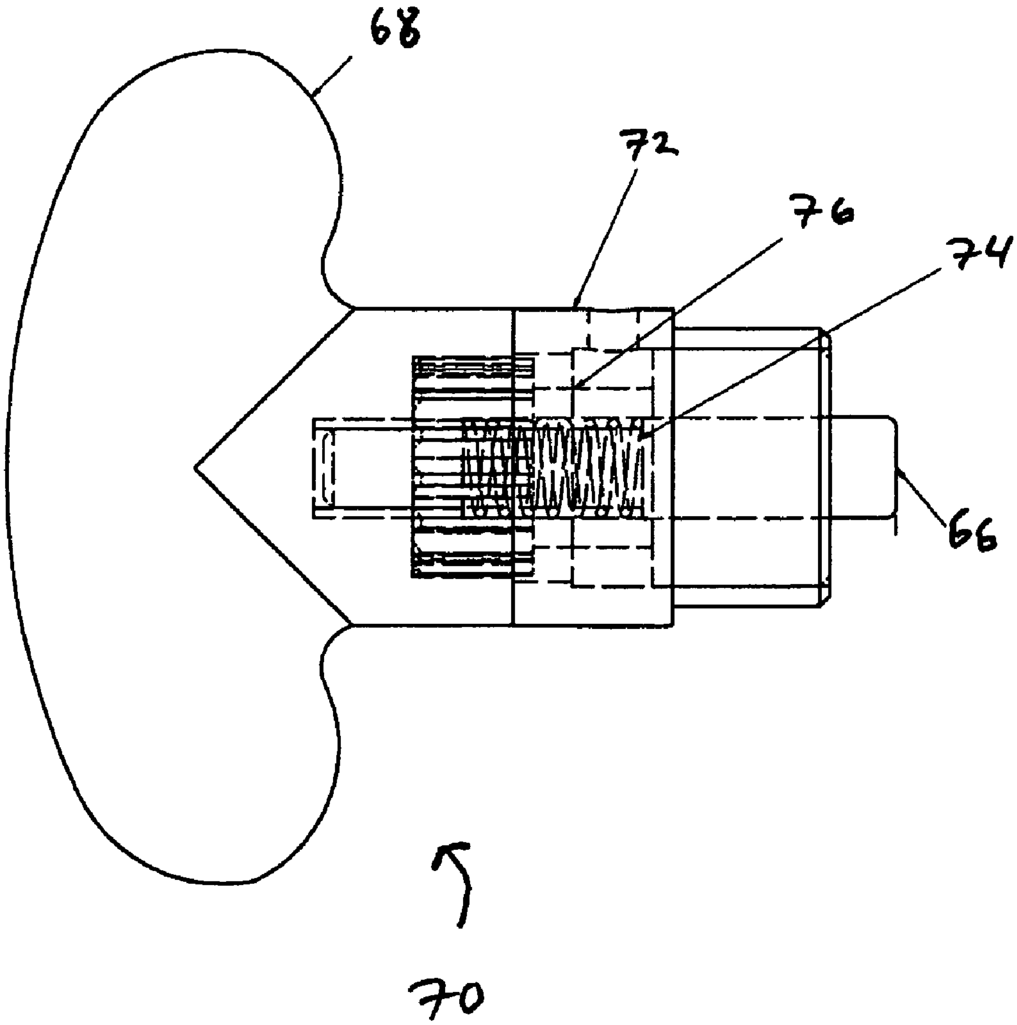
FIG. 8 is cross-sectional view of the adjustment handle-cotter assembly.
Figure 9:
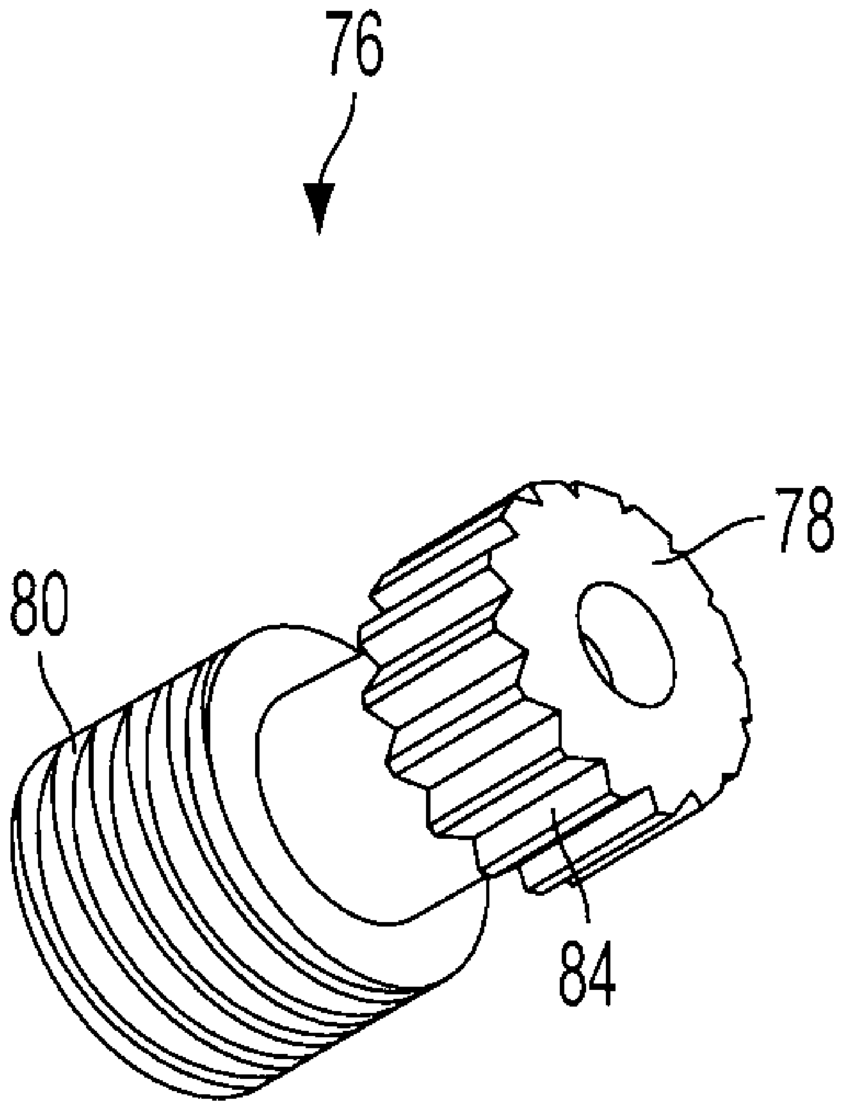
FIG. 9 is a perspective view of the concentric threaded insert.
Figure 10:
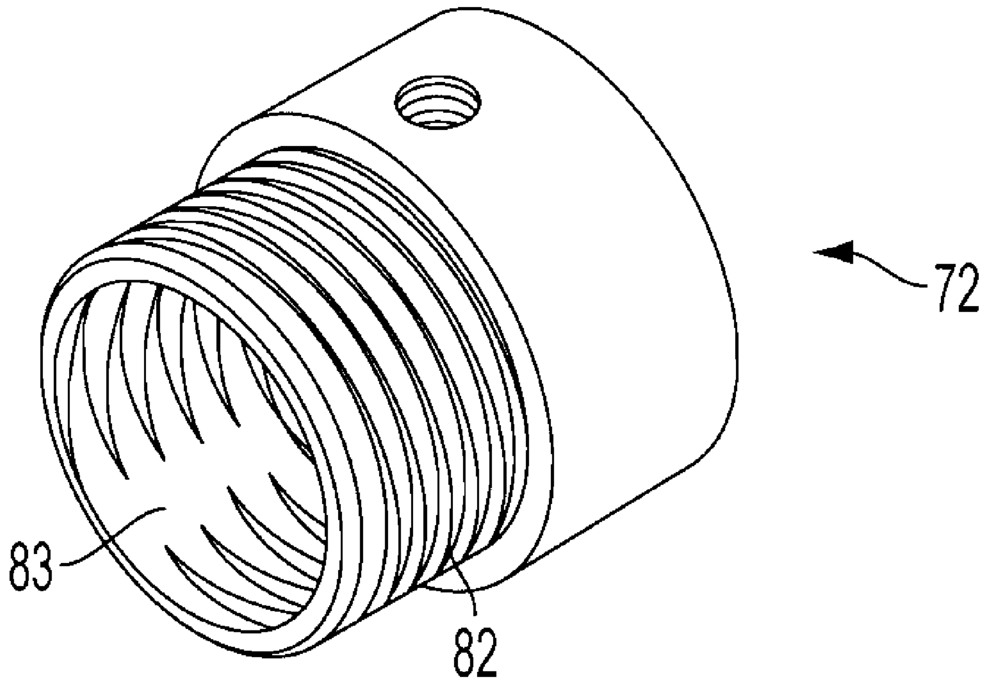
FIG. 10 is a perspective view of the threaded attachment ring.
Figure 11:
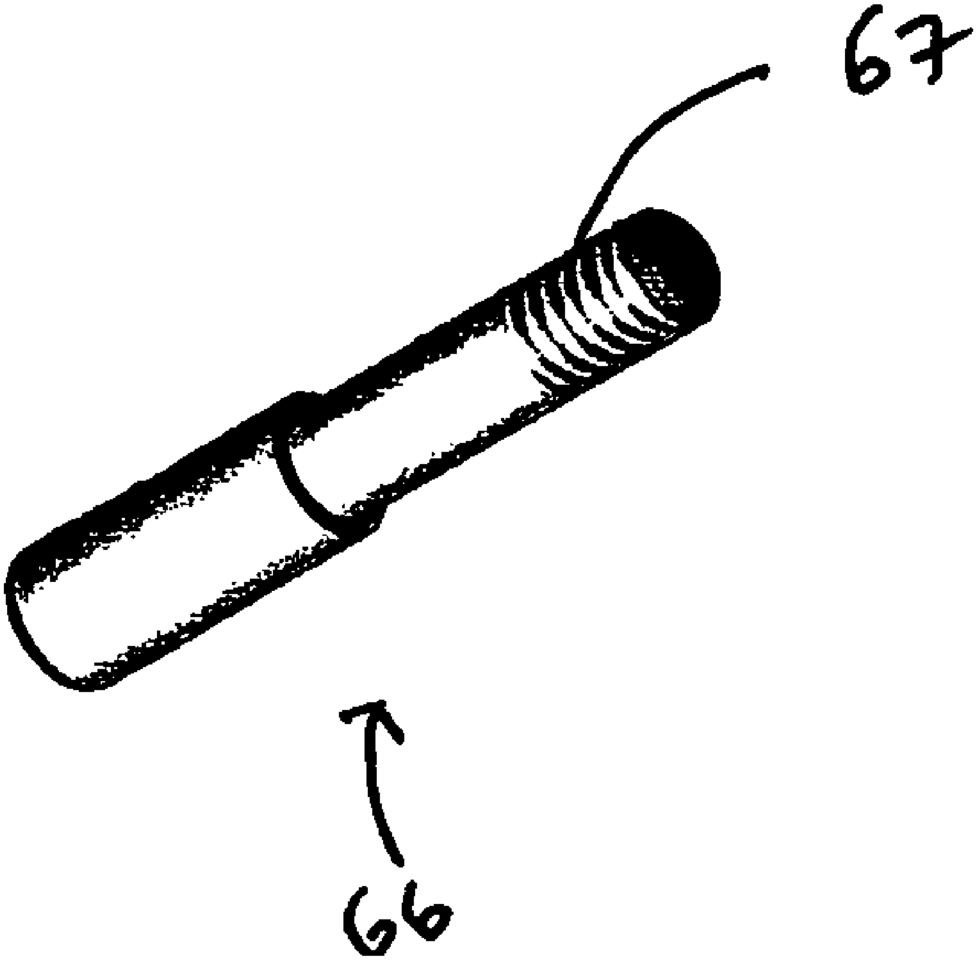
FIG. 11 is a perspective view of the cotter.

FIG. 7 shows an adjustment handle-cotter assembly 70. In use the handle assembly 70 is permanently attached to the collar 48 of the vertical end piece 32 by means of external threads 82 on a threaded attachment ring 72. FIG. 8 shows a cross-sectional diagram of the adjustment handle-cotter assembly 70. The cotter 66 (FIG. 11) is fixed to the handle 68 (by adhesive or threads 67 on the cotter), and a spring 74 is captured between the cotter and the concentric threaded insert 76 (FIG. 9). The treaded portion 80 of the concentric threaded insert 76 engages the internal threads 83 of the threaded attachment ring 72 (FIG. 10) so that when the cotter 66 is inserted into one of the openings 62 in the upright support member 24 (thereby setting its height), the concentric threaded insert 76 of the cotter-handle 70 assembly can be screwed in (by turning the handle) so that the cotter end 78 of the insert presses on the wall of the upright support member which surrounds the penetrated opening. This forces the triangular ridge 46 into the longitudinal "V" shaped groove 64 on the front side of the upright support member 24. The dimension and angle of the ridge 46 is selected so that binding or "wedging" occurs further stabilizing the upright support member 24 and rigidly locking it into position. A potential problem is that turning the handle 68 to result in optimal tightening may result in the handle 68 being at right angles to the upright support member 24. Because the handle 68 is oversized for ergonomic gripping by arthritic hands, when the handle 68 is at right angles, it may present an obstacle to the user. The engagement between the handle 68 and the threaded insert 76 is by way of meshing of the surface of a gear-toothed female cavity in the handle 68 that surrounds the threaded insert 76 and a geared portion 84 of the insert 76. This meshing allows the handle 68 to turn the threaded insert 76 as if they were one and the same piece. However, the cotter spring 74 makes it possible to pull the handle 68 back and away from this engagement (the geared portion 84 of the threaded insert 76 is no longer within the gear-toothed cavity). This slows the handle 68 to turn freely and allows easy adjustment of the handle position (to avoid becoming an obstacle) without compromising the interaction of the threaded insert 76 and the upright support member 24. When the threaded insert 76 is unscrewed sufficiently to no longer contact the upright support member 24, the handle 68 can be pulled back an additional distance to remove the cotter 66 from the hole 62 in the upright support member 24. Then, the upright support member 24 can be moved up or down to a different adjustment level. The cotter 66 is allowed to enter a new hole 62 and the handle 68 is used to tighten the concentric threaded insert 76 thus locking in the new height adjustment. This arrangement provides secure height adjustments with a captured handle-cotter assembly 70 (that cannot become lost like a free device) and an adjustment handle 68 that is can be disengaged so that it can be easily repositioned.

Figure 12:
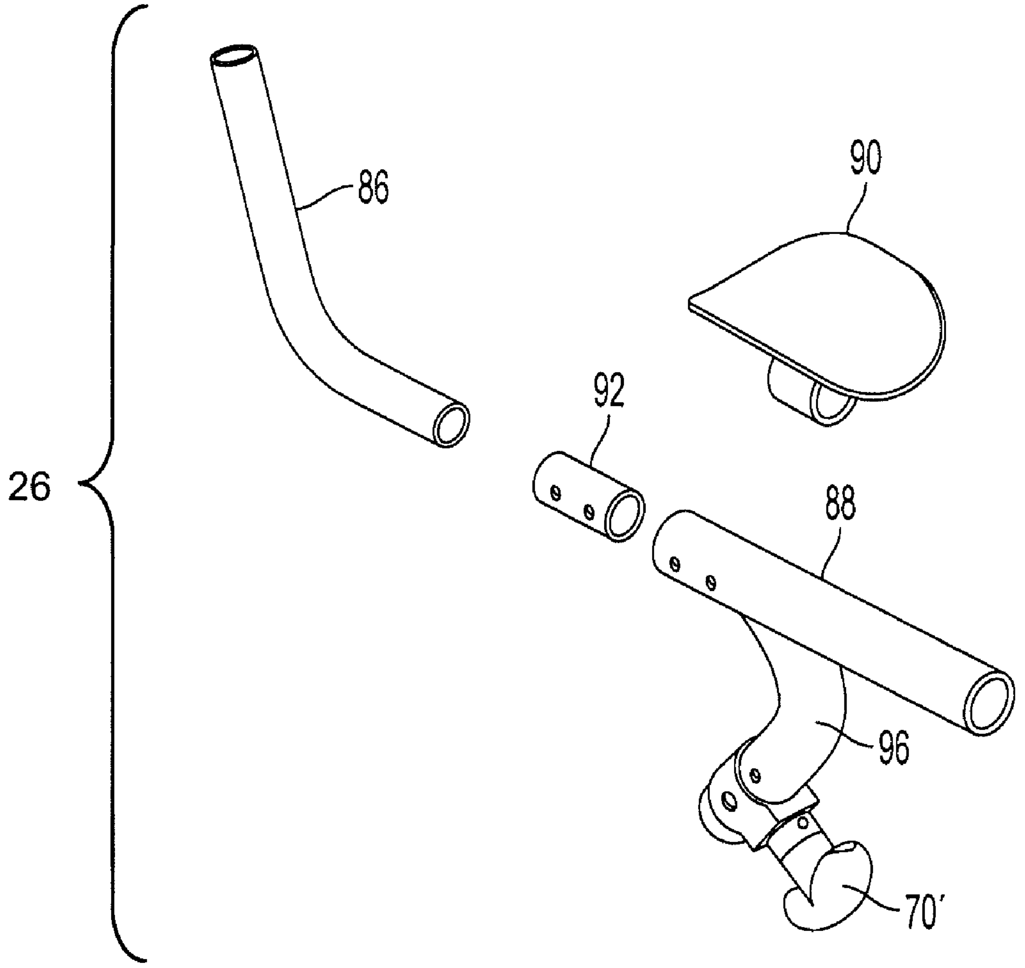
FIG. 12 shows an exploded perspective view of the arm support assembly.

FIG. 12 shows an exploded view of the arm support assembly 26 which includes a grip portion 86, a horizontal portion 88, a repositionable arm rest 90 which engages the horizontal portion 88 and a sleeve 92 for joining the grip portion 86 and the horizontal portion 88. In addition (FIG. 1) a brake handle 94 is positioned for easy gripping when a user's hand is at the grip portion 86. A curved arm support down tube 96 is attached to the lower surface of the arm support assembly 26. The curved arm support down 96 tube makes and angle of about 129° with the horizontal portion. When the 150° bend in the upright support member 24 is taken into account the horizontal portion would be expected to be about 9° from horizontal. In fact, reference to FIG. 2 shows that the upright support member 24 is angled back a few degrees from vertical. The end result is that the horizontal portion 88 is only a few degrees from horizontal. The horizontal portion 88 is angled slightly downward so that a user using his elbows to transfer part of his weight to the arm rest 90 will lean slightly forward because of the downward angling of his forearms. This ensures good contact with the grip portion and the brake levers attached thereto. This is a much more secure arrangement than if the horizontal portion 88 angled upward. The arm rest 90 is readily repositionable along the horizontal portion 88 to accommodate variations in the size and anatomy of users.

When the height of the upright support members 24 is properly adjusted, a user can have a significant portion of his weight (50% or more) supported through his elbows resting on the arm support member 24. This results in decompression or traction of the spine and can result in significant pain reduction, particularly in cases of spinal degeneration. The curved upright support members and the curved rear wheel support arms 50 provide appreciable give or "spring." This acts as a shock absorber and helps a user gently attain decompression. It will be appreciated that the ability to provide custom height adjustments of the upright support members 24 enhances decompression as adjustments can be made for scoliosis and other anatomical irregularities of the spine.

Figure 13:
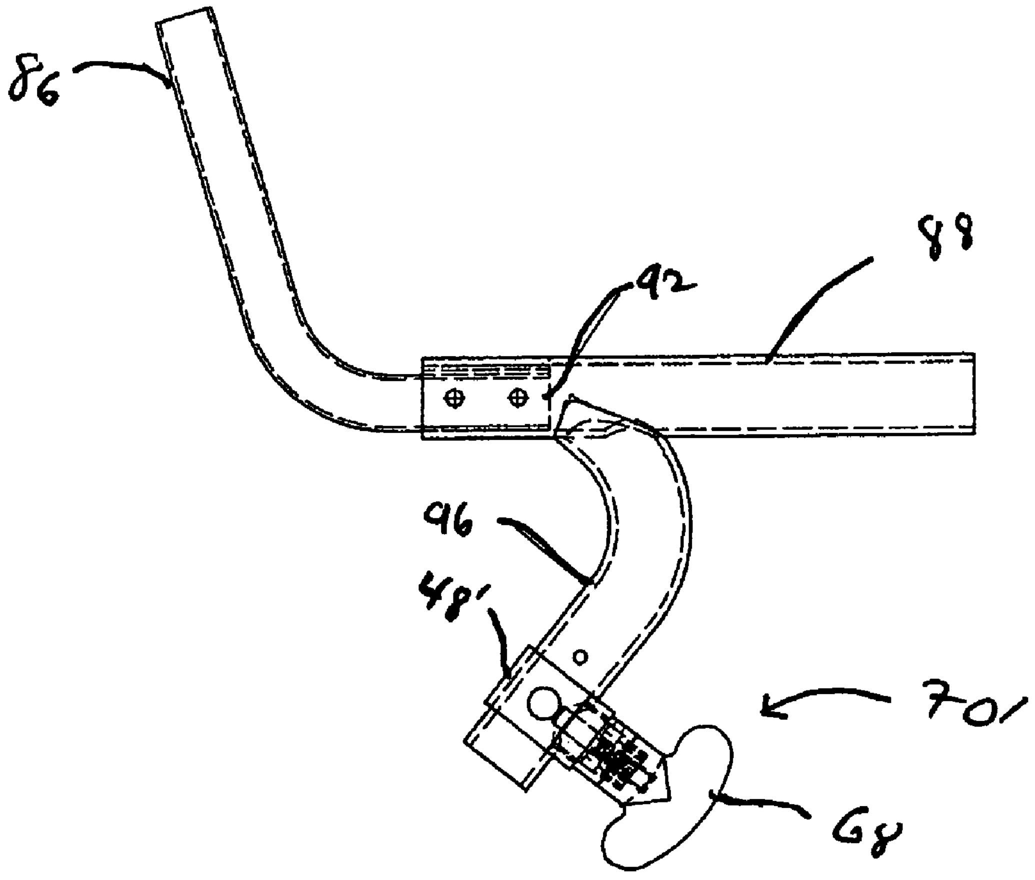
FIG. 13 shows a side view of the arm support assembly.
Figure 14:
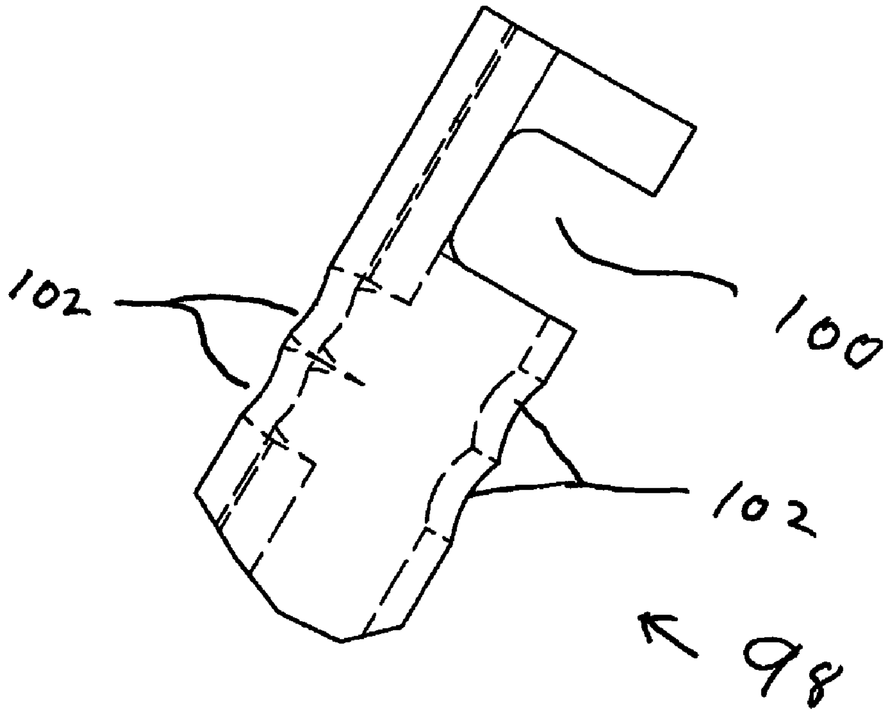
FIG. 14 is a close up diagram of the upper end of the upright support member.

FIG. 13 shows that the lower end of the curved arm support down 96 tube includes a welded collar 48' and adjustment handle-cotter assembly 70' similar to the one used for height adjustment of the upright support member 24. In this case the adjustment handle-cotter assembly 70' serves to lock the arm support assembly 26 in either the decompression configuration (discussed above) or in the alternative walking configuration and at the same time provides additional fine height adjustment. The lower end of the curved arm support down tube is sized to fit over the upper end 98 of the upright support member 24. FIG. 14 shows that the upper end 98 of the upright support member 24 bears a large slot 100 and two pairs of locator openings 102 with members of each pair spaced apart by ⅜" (0.953 cm). The major adjustment holes/openings 62 on the lower part of the upright support 24 are spaced apart by ¾" (1.91 cm) so that these additional adjustments allow intermediate adjustments of one half the value of the main adjustments. The adjustment handle-cotter 70' is used to select one of the two possible height settings. In addition, when the cotter 66 is withdrawn from the locator openings 102, the entire arm support assembly is free to rotate around the upper end 98 of the upright support member 24. The arm support assembly 26 will not detach from the upright support member because a bolt passes through that slot 100. In addition, the slot-bolt combination prevents the arm support assembly 26 from making a full revolution (i.e., the bolt runs into the longitudinal edges of the slot) which would kink internally located brake cables. When the arm support assembly 26 is rotated into the walking configuration, the second pair of locator openings can be used to lock it into position.

The arm support assemblies 26 are central to the multiple modes of user support provided by the mobilizer 20. As already explained the decompression configuration is extremely important and is designed to relieve spinal compression. In that configuration the arm support is nearly horizontal with its distal end pointing towards the front of the device and slightly downward. The user's elbow rests on the arm rest 90 near the proximal end of the horizontal portion 88 with the user's forearm extending forward parallel to the horizontal portion 88, and the user's hands positioned to grasp a distally located brake handle 94. The user's arm is bent at the elbow with the user's upper arm in a more or less vertical orientation. In this way the user leans on and is lifted and supported by the arm support assembly 26 so as to lift the user by means of his arms and shoulder girdle so that only a fraction of the user's weight is borne by the user's spine. In cases of spinal disc degeneration this "traction" effect can result in a dramatic reduction in pain.

Figure 15:
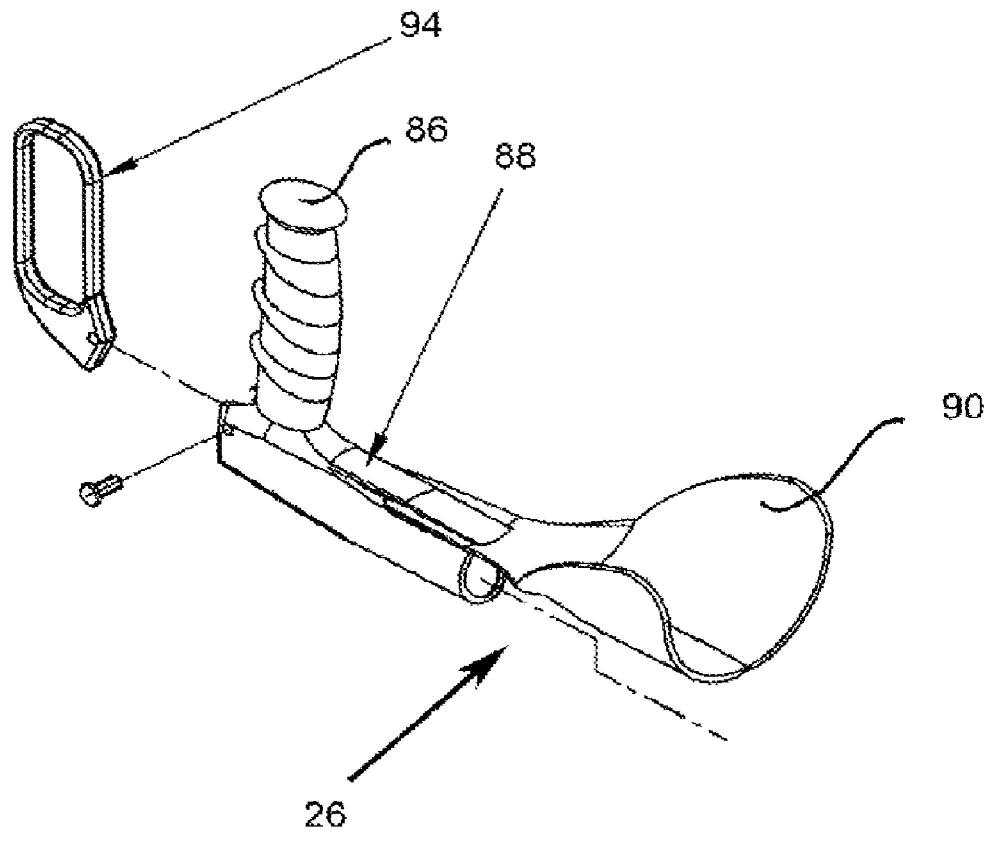
FIG. 15 shows a different embodiment of arm support assembly.

FIG. 15 shows a more ergonomic embodiment of the arm support assembly 26 with an easy to grasp brake handle 94 incorporated into the horizontal portion 88 of the arm support. The arm/elbow rest 90 more fully cups the elbow while the brake handle 97 is a loop through which the fingers are easily inserted. The user's thumb is then hooked behind the cushioned grip portion 86 of the horizontal arm support 88 so that a user with even a very weak grip can easily manipulate the brakes. In any embodiment the brakes are important features. The presently preferred means for engaging the brakes is a brake cable 104. Of course, other ways of engaging the brakes are also applicable including electronic and hydraulic brakes with the hydraulic lines replacing the cables. With a cable brake the cable 104 from the hand brake handle can run along the outside surface of the mobilizer, or, alternatively, it can run inside the hollow tubing that is usually used to form the frame of the device. The hand brake cable 104 terminates at a braking element. The braking element can take the form of a rim, drum, or disc brake, all of which are well known in the art. The braking element can be set to act as a traditional friction brake (that is, pulling the brake handle activates the brake), or, preferably, the brake is set as a default, with the user required to take some action before the brake is released—i.e., a "dead man" brake. A user may also be able to select the braking mode, so the wheels of the mobilizer either become stopped when the brake handle is pulled or become free to move when the handle is pulled. A mode where the brake is on as a default is generally the safest for a user that is unsure on his feet since a default brake keeps the mobilizer from rolling away if the user starts to fall forward. It will be appreciated that because the device is most commonly propelled in a forward direction, it is preferable to have brakes on the rear wheels. If brakes are placed only on the front wheels, application of the brakes may cause the device to tip forward.

Figure 16:
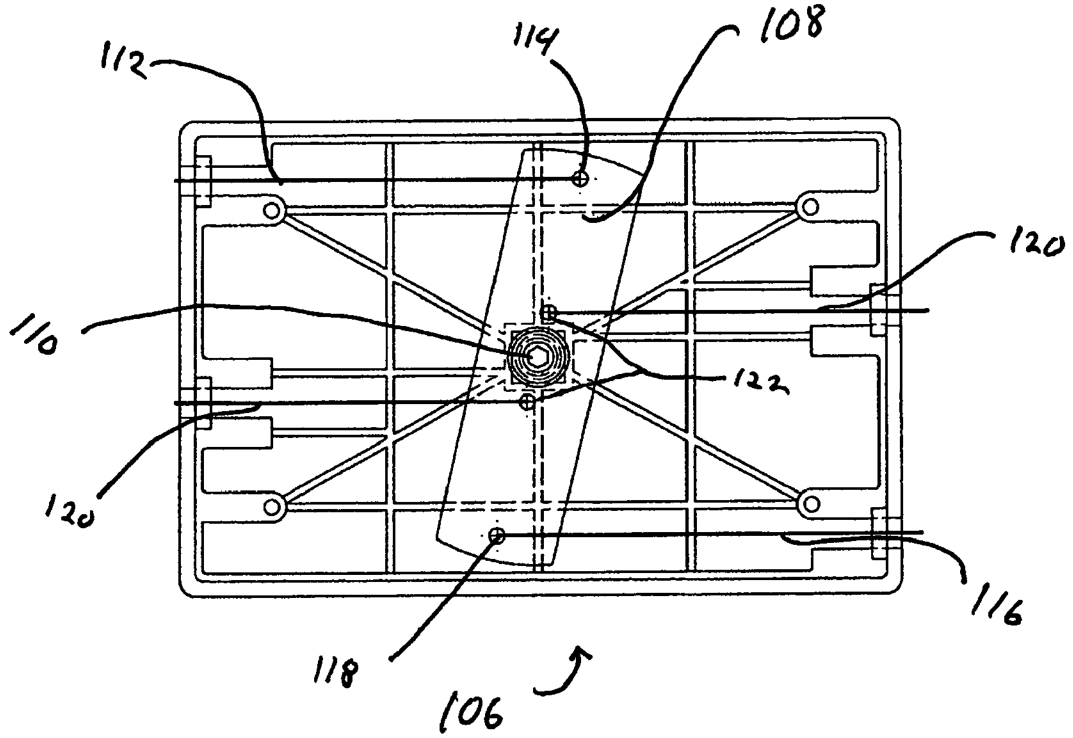
FIG. 16 shows a diagrammatic view of a brake equalizer used with the present device.

An additional problem with the brakes can result from unequal application side to side. Generally the left hand brake lever controls brakes on the left side of the device and the right hand brake level controls the right side. Many disabled individuals do not have equal left hand and right hand grips. Therefore, a simple brake equalizer 106, shown diagrammatically in FIG. 16 is used. An equalizer member 108 is pivotally attached by means of a bearing 110. The brake cable 112 from the left hand brake handle enters from the left and is fixed to an attachment point 114 at the top of the equalizer member. If that cable is pulled the equalizer member rotates 108 counterclockwise about the bearing. The brake cable 116 from the right hand brake handle enters from the right and is fixed to an attachment point 118 at the bottom of the equalizer member. If that cable is pulled the equalizer member again rotates counterclockwise about the bearing 110. Thus, activating either brake handle causes the equalizer member to rotate counterclockwise. The actuating cables 120 to the brakes enter and are fixed to attachment points 122 near the center of the equalizer member. Counterclockwise motion causes both of the brake cables to be pulled (activated) simultaneously. Because the brake handle cables are attached near the ends of the equalizer member, the equalizer arm acts as a mechanical lever so that the actual force applied to the brake cables is greater than the force applied to the brake handles. The equalizer can be mounted at a number of different locations on the mobilizer. It can advantageously be mounted between or on top of the upper and lower joining members 38, 40.

Figure 17:
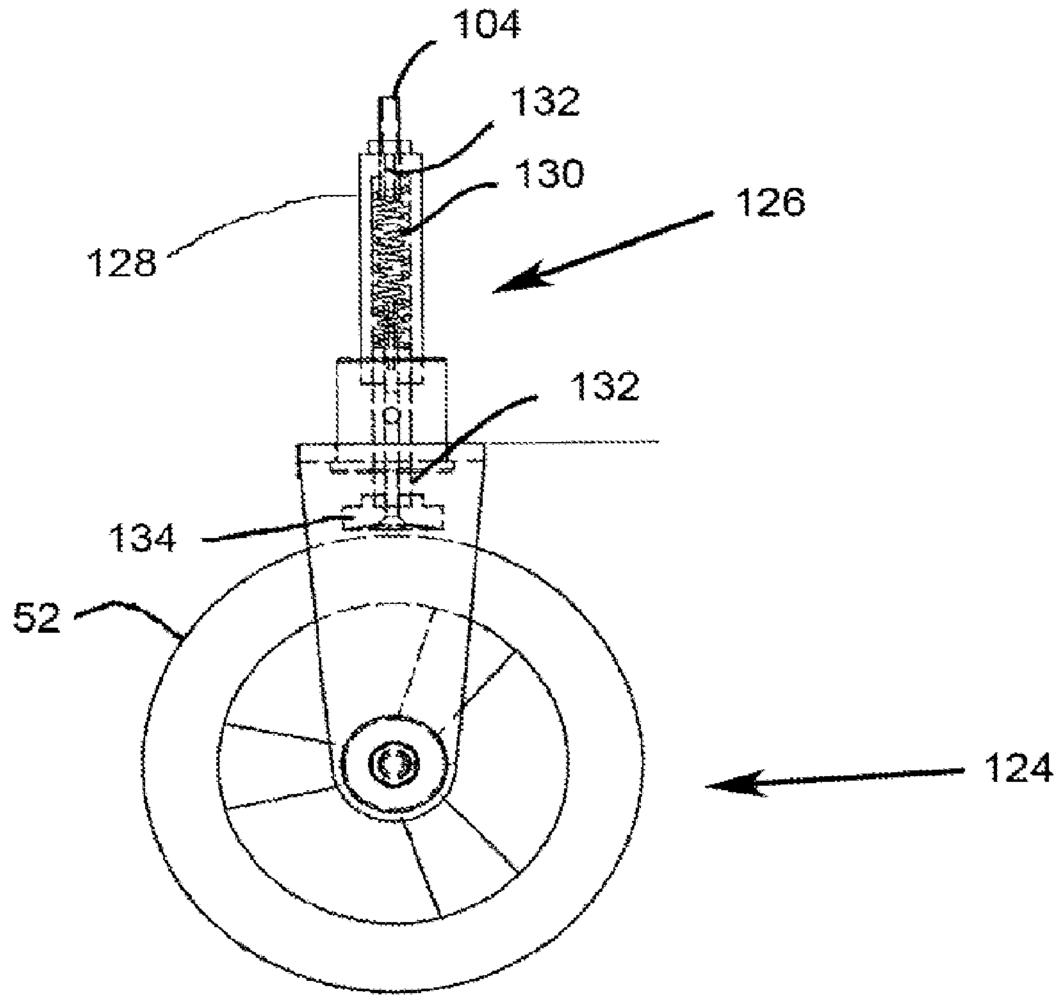
FIG. 17 shows a diagram of one of the rear wheel assemblies including the brake.

FIG. 17 shows a diagrammatic view of one of the rear wheel assemblies 124 in "x-ray" view to expose the workings of the brake 126. The wheel 52 is a typical plastic/rubber composition wheel although a variety of wheels would be equally applicable. The stem 128 by which the wheel is attached to the rear wheel support arm is hollow and contains a brake spring 130 biasing a brake shaft 132 to which is attached a distal brake pad 134. The pad 134 is made of rubber or any material that has a strong frictional interaction with the wheel surface. The spring 130 strongly biases the brake pad 134 into contact with the wheel surface and prevents the wheel from turning. This is inherently a default brake and the wheel is immobile until a releasing force is applied to the brake. This force is applied through a brake cable 104 attached at the top end of the stem 128 and connected to the brake shaft 132 so as to pull the shaft 132 against the spring 130, thereby lifting the brake pad 134 from the wheel surface.

Figure 18:
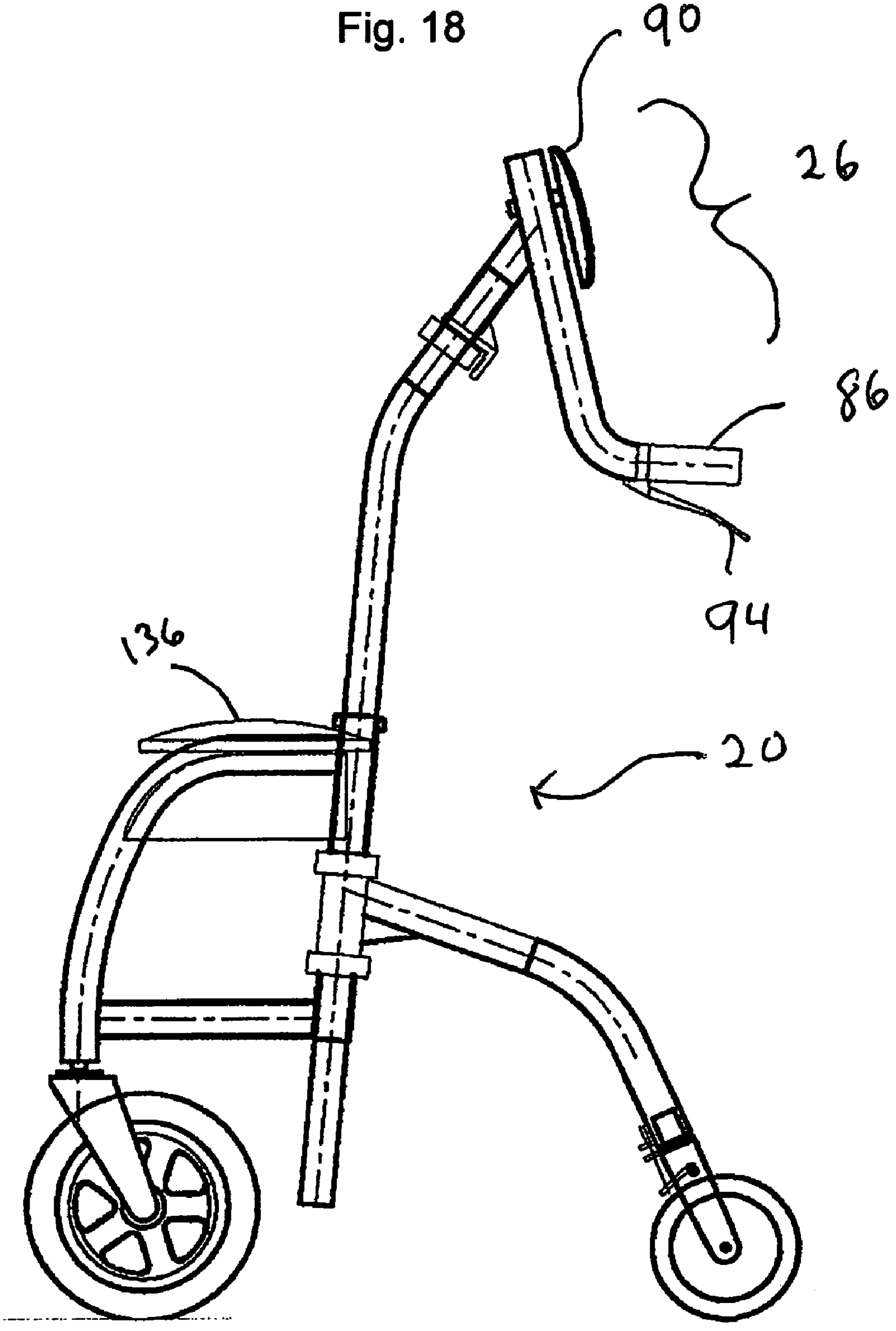
FIG. 18 is a diagram of the device in "walking" configuration.

FIG. 18 shows a slightly different embodiment of the mobilizer with the arm support assemblies in the walking configuration. When the arm support assembly is rotated 180 degrees, the various angles of the components combine so that the grip portion 86 is oriented in a nearly horizontal direction. In this orientation the brake handles 94 are positioned at or near the user's waist so that the user can grasp the handles in a manner similar to the handles of a traditional walker. That is, the user grasps the handles for stability and pushes the mobilizer 20 forward while being stabilized by the mobilizer 20. While this configuration does not provide the spinal benefits of the decompression configuration, it is beneficial for users who do not require such decompression plus this configuration is very useful for transferring a user from one position or location to another because it supplies maximum support and balance during the transfer. Note that when the arm support assembly 26 is pivoted into the second configuration, the user is still able to easily grasp and control the brake lever/handles 94 and benefits from the safety and security of the braking system. It will be apparent that depending on the individual user, the height adjustment of the upright support members may require some adjustment upon changing the mobilizer from the decompression configuration to the walking configuration. As explained above, this is easily accomplished.

Figure 19:
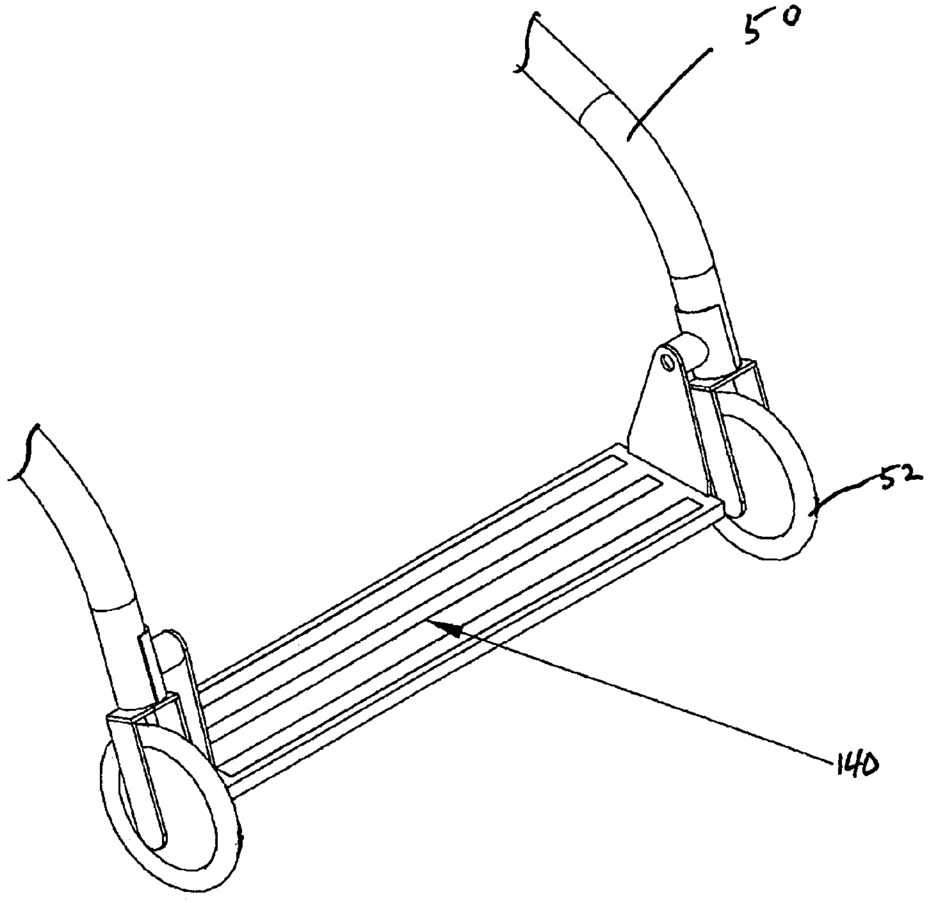
FIG. 19 shows a foot plate that can be used with the mobilizer.
Figure 20:
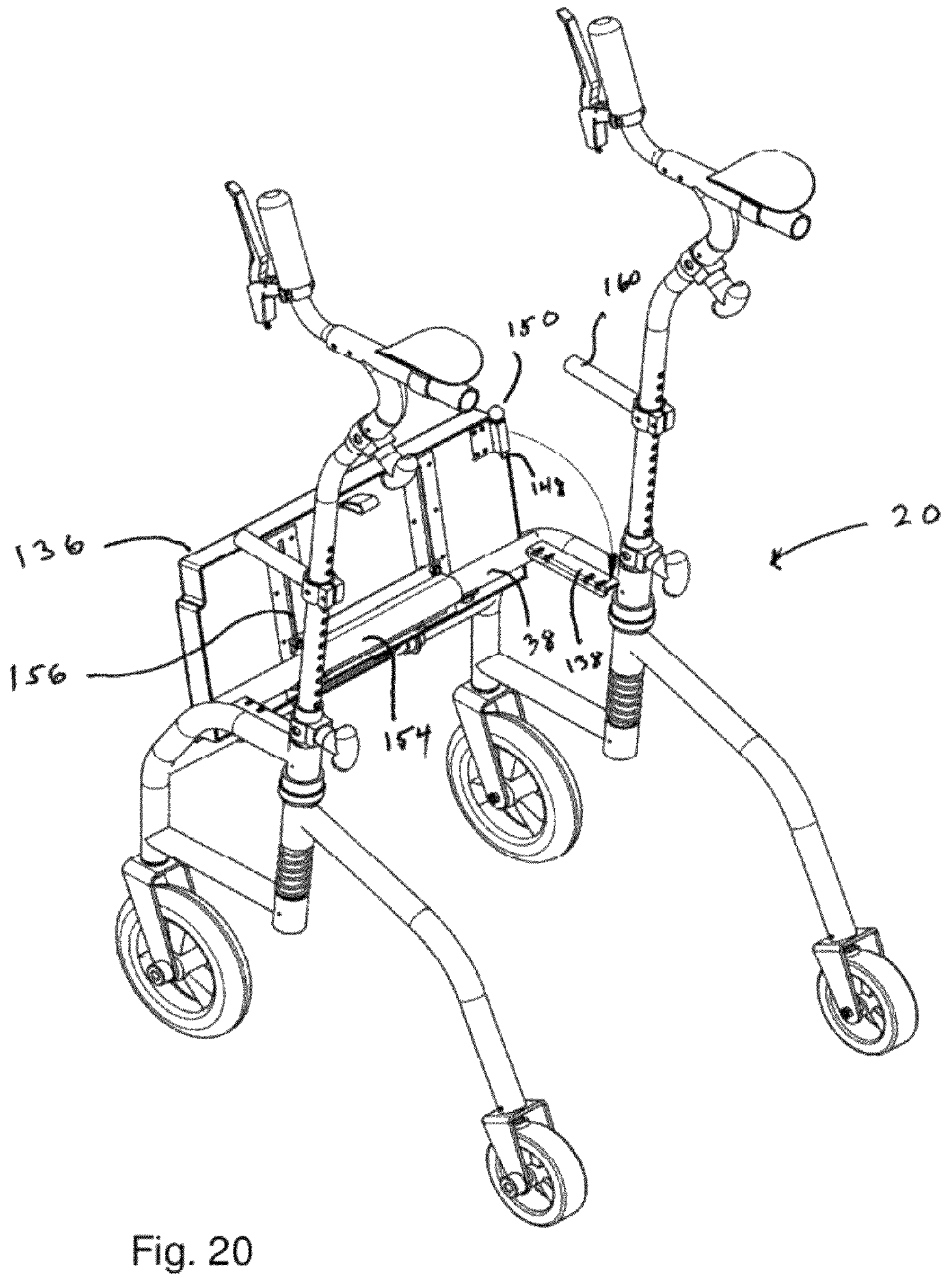
FIG. 20 shows details of the adjustable seat of the mobilizer.

Because the frame is open from the rear, a user is able to step into the frame from the rear with the frame forming a "cage" surrounding him. Adjustable hand holds 160 are provided and a convenient seat 136 is hingedly supported at either end by bosses 138 attached to the curved members 36 of the side assemblies 28 and by the upper joining member 38. When the seat 136 is not in use or if it interferes with the walking configuration, it can be flipped forward (pivoting at the upper horizontal joining member 38) so that it is vertical or even slides down over the front of the upper and lower joining members 38, 40. FIG. 20 shows the back of the seat 136 flipped up. In this embodiment the seat 136 is hingedly attached to the joining member 38 by a sleeve 154. When the seat 136 is flipped into the vertical orientation (as shown), the seat can slide down in front of the upper joining member by means of a sliding track 156. If the user becomes fatigued, he can flip the seat 136 into position, sit down on the seat and propel himself with his feet. When the seat is flipped down, its end is supported by a boss 138 which interacts with a lock pin 148 to main the seat safely in a locked down state. The lock pin is released by pulling on a release knob 150. FIG. 19 shows a detachable foot plate 140 that can be attached to and between the rear wheel support arms 50. This allows the user's feet to be easily suspended above the ground so that a helper can push the entire device 20 (with the user in a seated position) not unlike a wheelchair. If the user is to be transported in a substantially upright orientation, the foot plate 140 is sufficiently strong that the user may stand on it while being supported by the arm supports in their rear-facing walking configuration. If desired, the foot plate can be reinforced with one or more small caster wheels (not shown).

It will be apparent to one of skill in the art that when the mobilizer is used with the user seated, the user usually faces towards the usual rear end of the device and the entire device is moved in a rearward direction. An optional backrest bar can be attached between the upright support assemblies so as to support the back of a seated user. A preferred design for the backrest bar is an arcuate rest that can be flipped so that the rest can accommodate a user sitting either facing the front or the rear of the mobilizer. For example an arcuate backrest can be pivotally attached by a bolt passing through a sleeve or a similar arrangement to a short vertical member attached to the upright support members. Tabs can then be provided so that when the backrest is flipped from a front facing to a rear facing configuration, the backrest is held in a plane substantially parallel to the plane of the seat. When the mobilizer 20 is not used in the seated configuration and the seat 136 is placed in the flipped forward position, an accessory tray or basket can be attached so that the user can readily carry a purse, briefcase, phone, shopping bags and other personal items. It is also possible to leave the seat in the seating configuration and attach an accessory tray on top of it.

The following claims are thus to be understood to include what is specifically illustrated and described above, what is conceptually equivalent, what can be obviously substituted and also what essentially incorporates the essential idea of the invention. Those skilled in the art will appreciate that various adaptations and modifications of the just-described preferred embodiment can be configured without departing from the scope of the invention. The illustrated embodiment has been set forth only for the purposes of example and that should not be taken as limiting the invention. Therefore, it is to be understood that, within the scope of the appended claims, the invention may be practiced other than as specifically described herein.

We claim:

1. A mobilizer device providing mobility support to a user comprising:
- a base frame having a front and a rear;
- a pair of pivotally mounted front wheels each one connected to the front of the base frame;
- a pair of elongate rear wheel supports each one connected to the rear of the base frame and extending rearward therefrom;
- a pair of rear wheels each one connected to a distal end of one of the elongate rear wheel supports;
- a pair of upright support members each one connected to the rear of the base frame, a bend in each upright support member displacing an upper end of each support member towards the rear; and
- a pair of arm support assemblies for providing support to an individual's upper body, each connected adjustably to the upper end of one of the upright support members by a pivoting adjustment mechanism whereby each of the connected arm support assemblies can rotate around the upper end adjusting one or both of the arm support assemblies from a first position where the arm support assembly points to the front and is essentially horizontal for providing spinal decompression by supporting the user's weight through the elbow and forearm being in contact with the arm support assembly to a second position where the arm support assembly points to the rear and is essentially vertical so that the user's hand is able to grasp a distal end of the arm support assembly for stability while walking.

2. The mobilizer device according to claim 1, wherein at least one arm support assembly includes a hand operated brake lever operationally coupled to a braking mechanism on at least one of the wheels.

3. The mobilizer device according to claim 2, wherein the braking mechanism is operationally coupled to at least one of the rear wheels.

4. The mobilizer device according to claim 2, wherein the brake lever is coupled to the braking mechanism by a cable.

5. The mobilizer device according to claim 2, wherein the brake lever is coupled to a brake equalizer that is in turn coupled to the braking mechanism.

6. The mobilizer device according to claim 2, wherein the braking mechanism is a default braking mechanism.

7. The mobilizer device according to claim 1, wherein the rear wheels are pivotally mounted.

8. The mobilizer device according to claim 1, wherein the upper support members further comprise anti-pivoting mechanisms comprising triangular ridges captured in "V" shaped grooves.

9. The mobilizer device according to claim 1 further comprising a first height adjustment mechanism for adjusting the height of the arm support assemblies.

10. The mobilizer device according to claim 9, wherein the height adjustment mechanism comprises a cotter removably inserted into a hole in the upright support member.

11. The mobilizer device according to claim 9, wherein the height adjustment mechanism further comprises an adjustment handle for withdrawing the cotter and for tightening an insert which presses against the upright support member.

12. The mobilizer device according to claim 11, wherein the adjustment handle for withdrawing the cotter and for tightening an insert further comprises means for temporarily disengaging the handle from the insert.

13. The mobilizer device according to claim 9, wherein a second height adjustment mechanism is disposed between the upright support member and the arm support assembly.

14. The mobilizer device according to claim 13 further comprising a foot plate disposed between the rear wheel supports.

15. The mobilizer device according to claim 1 further comprising a seat.

16. The mobilizer device according to claim 15, wherein the seat is hingedly attached.

17. The mobilizer device according to claim 16, wherein the seat further comprises a locking mechanism.

18. A mobilizer device providing mobility support to a user comprising:
- a base frame having a front and a rear comprising two side assemblies joined across the front by at least one elongate joining member;
- a pair of pivotally mounted front wheels each one connected to the front of the base frame at the corners thereof;
- a pair of elongate rear wheel supports each one pivotally connected to the rear corners of the base frame and extending rearward therefrom;
- means for locking and unlocking the elongate rear wheel supports to allow them to be configured for storage;
- a pair of non-pivoting rear wheels each one connected to a distal end of one of the elongate rear wheel supports;
- a pair of upright support members each one connected to one of the upper rear corners of the base frame, further comprising a height adjustment mechanism and a bend in each upright support member that displaces an upper end of each support member towards the rear; and
- a pair of arm support assemblies for providing support to an individual's upper body, each pivotally connected to the upper end of one of the upright support members by pivot with a locking mechanism whereby, when the locking mechanism is unlocked, one or both of the arm support assemblies can be rotated around the upper end from a first position where the arm support assembly points to the front and is essentially horizontal and for providing spinal decompression by supporting the user's weight through the elbow and forearm being in contact with the arm support assembly, thereby removing weight from the user's spine, to a second position where the arm support assembly points to the rear and is essentially vertical so that the user's hand is able to grasp a distal end of the arm support assembly for stability while walking.

19. A mobilizer device providing mobility support to a user comprising:
- a base frame having a front and a rear comprising two side assemblies joined across the front by at least two elongate joining member;
- a pair of pivotally mounted front wheels each one connected to the front of the base frame at the corners thereof;
- a pair of elongate rear wheel supports each one pivotally connected to the rear corners of the base frame and extending rearward therefrom;
- means for locking and unlocking the elongate rear wheel supports to allow them to be configured for storage;
- a pair of non-pivoting rear wheel assemblies each one connected to a distal end of one of the elongate rear wheel supports, each of the rear wheel assemblies further comprising a braking mechanism;
- a pair of upright support members each one connected to one of the upper rear corners of the base frame, further comprising a height adjustment mechanism and a bend in each upright support member that displaces an upper end of each support member towards the rear; and a pair of arm support assemblies for providing support to an individual's upper body, each pivotally connected to the upper end of one of the upright support members by pivot with a locking mechanism whereby, when the locking mechanism is unlocked, one or both of the arm support assemblies can be rotated around the upper end from a first position where the arm support assembly points to the front and is essentially horizontal for providing spinal decompression by supporting the user's weight through the elbow and forearm being in contact with the arm support assembly, thereby removing weight from the user's spine, to a second position where the arm support assembly points to the rear and is essentially vertical so that the user's hand is able to grasp a distal end of the arm support assembly for stability while walking.

* * * * *